United States Patent Office 3,287,406
Patented Nov. 22, 1966

---

3,287,406
FLUORINE-CONTAINING 1,3,2,4-DIAZADI-PHOSPHETADINES
Reinhard Schmutzler, Wilmington, Del., assignor to E. I. du Pont de Nemours and Company, Wilmington, Del., a corporation of Delaware
No Drawing. Filed Aug. 14, 1963, Ser. No. 301,985
9 Claims. (Cl. 260—543)

The present invention relates to a class of novel phosphorus-nitrogen compounds useful in catalyzing polymerization reactions and as chemical synthesis intermediates.

The compounds of the present invention have the structure

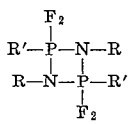

wherein R is methyl or ethyl and R' is a monovalent organic radical or fluorine.

The compounds of the present invention are prepared by reacting together a compound of the structure $R_3SiN(R)SiR_3$ (heptasubstituted disilizane)

and $PF_aR'_b$ wherein R and R' have the same meaning as described hereinbefore, $a$ is 4 through 5 (i.e., $a$ is 4 or 5), $b$ is 0 through 1 (i.e., $b$ is 0 or 1), and the sum of $a$ and $b$ is five.

In describing the compounds of this invention the basic ring structure

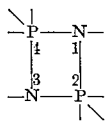

is named 1,3,2,4-diazadiphosphetidine having the numbering shown.

R' is selected independently from alkyl, cycloaliphatic, or aromatic monovalent organic radicals, preferably those containing not more than about 20 C atoms. In addition, R' can be fluorine. The radicals can be substituted with any substituents not reactive with the disilizane or with the $PF_aR'_b$ compound. Suitable substituents are alkyl, cycloaliphatic, aromatic, alkoxy, aryloxy, nitro, cyano.

The compounds of this invention are useful as cocatalysts for the anionic polymerization of lactams, especially ε-caprolactam. A description of the anionic polymerization of lactams is found in U.S. Patent 3,017,391. The use of representative compounds of the present invention as cocatalysts is exemplified hereinafter. Illustrative of compounds of the invention are:

1,3-dimethyl-2,4-diphenyl-2,2,4,4-tetrafluoro-1,3,2,4-diazadiphosphetidine
1,3-dimethyl-2,4-dibenzyl-2,2,4,4-tetrafluoro-1,3,2,4-diazadiphosphetidine
1,3-dimethyl-2,4-dicyclohexyl-2,2,4,4-tetrafluoro-1,3,2,4-diazadiphophetidine
1-methyl-3-ethyl-2-phenyl-4-ethyl-2,2,4,4-tetrafluoro-1,3,2,4-diazadiphosphetidine
1-ethyl-3-methyl-2-propyl-4-ioamyl-2,2,4,4-tetrafluoro-1,3,2,4-diazadiphosphetidine
1-ethyl-3-methyl-2,4-diphenyl-2,2,4,4-tetrafluoro-1,3,2,4-diazadiphosphetidine
1,3-dimethyl-2,4-di-(p-tolyl)-2,2,4,4-tetrafluoro-1,3,2,4-diazadiphosphetidine
1,3-dimethyl-2,4-di-(m-tolyl)-2,2,4,4-tetrafluoro-1,3,2,4-diazadiphosphetidine
1,3-dimethyl-2,4-di-(p-ethylphenyl)-2,2,4,4-tetrafluoro-1,3,2,4-diazadiphosphetidine
1,3-dimethyl-2,4-di-(p-methoxyphenyl)-2,2,4,4-tetrafluoro-1,3,2,4-diazadiphosphetidine
1,3-dimethyl-2,4-di-(α-naphthyl)-2,2,4,4-tetrafluoro-1,3,2,4-diazadiphosphetidine
1,3-dimethyl-2,4-di-(p-phenylphenyl)-2,2,4,4-tetrafluoro-1,3,2,4-diazadiphosphetidine
1,3-diethyl-2,4-di-(p-cyanophenyl)-2,2,4,4-tetrafluoro-1,3,2,4-diazadiphosphetidine
1,3-diethyl-2,4-di-(m-nitrophenyl)-2,2,4,4-tertafluoro-1,3,2,4-diazadiphosphetidine
1,3-diethyl-2,4-di-(p-phenoxyphenyl)-2,2,4,4-tetrafluoro-1,3,2,4-diazadiphosphetidine
1,3-diethyl-2,4-didodecyl-2,2,4,4-tetrafluoro-1,3,2,4-diazadiphosphetidine
1,3-diethyl-2,4-dioctyl-2,2,4,4-tetrafluoro-1,3,2,4-diazadiphosphetidine
1,3-diethyl-2,4,-di-(sec-amyl)-2,2,4,4-tetrafluoro-1,3,2,4-diazadiphosphetidine
1,3-diethyl-2,4-di-(p-dodecylphenyl)-2,2,4,4-tetrafluoro-1,3,2,4-diazadiphosphetidine The compounds of the invention are prepared by contacting the $PF_aR'_b$ component with the $R_3SiN(R)Si(R_3)$ component at temperatures between about 0° and about 150° C., with the preferred range being from about 20 to about 50° C., whereby reaction occurs to produce compounds of the invention. If the reaction temperature is higher than the boiling point of any reactant the reaction is conducted in a sealed vessel of such construction as to withstand the pressure generated by the reactants at the reaction temperature. The ratio of the two components is preferably stoichiometric but any ratio can be used with the yield then being determined by the quantity of the reactant present in least molar amount.

If the compound desired has different substituents on the two nitrogen atoms or on the two phosphorus atoms it is made by reacting a mixture of the components. For example, if 1-methyl-3-ethyl-2-phenyl-4-ethyl-1,3,2,4-diazadiphosphetidine is desired a mixture of

Heptamethyldisilizane $(CH_3)_3SiN(CH_3)Si(CH_3)_3$ is heated. The components of the product are then separated by distillation.

Heptamethyldisilizane $(CH_3)_3Sin(CH_3)Si(CH_3)_3$ is prepared by the method given in Inorganic Syntheses, vol. V, p. 58, McGraw-Hill, 1957, from $(CH_3)_3SiCl$ and $CH_3NH_2$. For the preparation of compounds of the type $R_3SiN(R)SiR_3$, where R is ethyl, a similar procedure is used with the substitution of the triethylsilane for trimethyl chlorosilane and the ethylamine for methylamine. For example

is prepared by treating $(C_2H_5)_3SiCl$ with $C_2H_5NH_2$ under similar conditions.

Inert solvents can be used to dilute the reactants but are not needed. Such solvents include benzene, toluene, xylene, cyclohexane, chlorobenzene, hexane, pentane, methylcyclohexane, ethylene chloride, chloroform, carbon tetrachloride, and 1,2-difluorotetrachloroethane.

The products generally are separated from the reaction mixture by distillation but recrystallization or other conventional techniques can be used.

The compounds of the present invention are stable solids or liquids having surprising hydrolytic stability to aqueous media. As exemplified hereinafter,

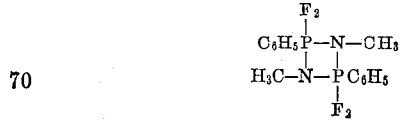

resists boiling water for several hours without substantial hydrolysis. The corresponding compounds in which chlorine replaces the fluorine are hydrolyzed almost immediately by water at room temperature.

The invention is further illustrated by the following detailed examples of compounds of the invention, their preparation and utility. Parts and percentages are by weight.

EXAMPLE 1

To 13.15 parts of heptamethyldisilazane in a reaction vessel protected against atmospheric moisture is added slowly, with stirring, 18.4 parts of phenyltetrafluorophosphorane, keeping the temperature at 50° C. After about half of the fluorophosphorane is added a gas is evolved which is identified as trimethylfluorosilane by infrared absorption. The quantity of this gas amounts to 95% of theoretical yield. After all of the fluorophosphorane is added volatile material is removed at 0.1 mm. pressure and 30° C. 3.5 parts of unreacted phenyltetrafluorophosphorane is recovered. The remaining solid melts at 161° C. After two recrystallizations from benzene the melting point is raised to 162° C. indicating a high degree of purity in the crude product. The compound is identified as

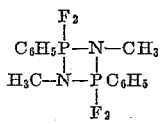

1,3 - dimethyl - 2,4 - diphenyl-2,2,4,4-tetrafluoro-1,3,2,4-diazadiphosphetidine, by nuclear magnetic resonance, obtaining the following result:

The fluorine NMR spectrum in a saturated benzene solution gives a sharp doublet with PF splitting, J–876 cycles per second. The splitting remains unchanged on heating the sample to 50° C.

The proton NMR spectrum in a saturated CDCl$_3$ solution against a tetramethylsilane standard gives two general areas: a symmetrical triplet (1:2:1) in the methyl region centered at 2.46 p.p.m. from the standard. The multiplet structure is due to coupling of the methyl protons with adjacent P atoms $J_{P-H}=12.5$ cycles per second. An aromatic multiplet is centered at ca. −7.7 p.p.m. from the standard. Integration of the curve leads to a 3:5 ratio of aliphatic to aromatic protons.

Crystallographic study by conventional means showed the element cell to have the following dimensions:

$a=11.20$ A.
$b=7.70$ A.
$c=18.48$ A.

space group $D_{2h}^{15}-Pbca$

With four molecules in the unit cell the X-ray density is 1.46 g./cc.

The elemental analysis is—

Calcd. for $C_{14}H_{16}N_2P_2F_4$: C, 48.0; H, 4.6; F, 21.7; N, 8.0; P, 17.9. Found C, 47.9; H, 5.2; F, 21.6; N, 8.2; P, 17.7. The cryoscopic molecular weight in acetonitrile is 347 as compared to 350.2 theory.

The infrared spectrum as a solid in a KBr pellet is as follows: 3060 (w.), 2940 (m.), 2890 (v.w.), 2816 (w.), 1820 (w.), 1593 (w.), 1486 (m.), 1440 (s.), 1420 (v.w.), 1383 (w.), 1314 (m.), 1230, 1172, 1123 (v.s.), 975 (m.), 928 (w.), 879, 849 (v.w.), 835, 829 (v.s.), 768, 760 (v.s.), 744, 735 (v.s.), 691 (v.s.), 605 (v.s.), 539 (v.s.), 503, 484 (s.). Abbreviations used in describing the intensity of bands in the infrared spectrum are as follows: w.=weak, s.=strong, v.s.=very strong, sh.=shoulder, bd.=broad, m.=medium.

The ultraviolet spectrum (0.516 mg./ml. in cyclohexane) shows maxima at 257, 264 and 271 m$\mu$, extinction coefficient 13.060.

Attempted hydrolysis by heating in water at 100° C. for 3 hours fails. The product still has a melting point of 162° C. and the infrared spectrum is the same.

EXAMPLE 2

In a closed Monel cylinder, flushed with nitrogen, is placed 11 parts of C$_2$H$_5$PF$_4$ and 13.9 parts of heptamethyldisilazane. The cylinder is cooled in liquid nitrogen, evacuated to 1 mm. pressure and then heated for four hours at 120° C. The cylinder is then cooled to 0° C. and volatile material removed under 200 mm. pressure. (CH$_3$)$_3$SiF (7.9 parts) is obtained. The viscous yellow liquid remaining in the cylinder is washed out with ether. The ether is evaporated and the residue is distilled through a 5-inch Vigreux column to give 6.5 parts of 1,3-dimethyl-2,4 - diethyl - 2,2,4,4-tetrafluoro-1,3,2,4-diazadiphosphetidine boiling at 40–45° at 1 mm. pressure. After one redistillation the liquid boils at 42° at 1 mm. pressure, $n_D^{25.5}$ 1.4171.

Analysis.—Calcd. for C$_6$H$_{16}$P$_2$F$_4$N$_2$: C, 28.4; H, 6.3; N, 11.0; F, 29.9; P, 24.4. Found: C, 28.5; H, 6.3; N, 11.1; F, 29.8; P, 24.9. Molecular weight: Calcd., 254.16. Found, 272.

Infrared spectrum 2932 (s), 2918 (m.), 1459 (s.), 1429, 1380 (w.), 1226, 1176 (v.s.), 1029 (s.), 897, 838 (v.s.), 807 (s., bd.), 784 (s., bd.), 746 (m., bd.), 678 (s.), 592 (w.), 563 (m., bd.), 529, 513 (s.), 489 (s.).

Fluorine NMR spectrum—sharp doublet $J_{P-F}=881$ cycles/sec.

Proton NMR spectrum—1–2–1 triplet centered at −2.47 p.p.m. from tetramethylsilane standard $J_{P-H}=12.5$ cycles/sec. multiplet due to ethyl group between −0.75 and −1.42 p.p.m.

EXAMPLE 3

In a stainless steel reaction vessel (flushed with nitrogen) is placed 29 parts of heptamethyldisilazane. After cooling to −80° C. and evacuating to 1 mm. pressure, 23 parts of PF$_5$ are added. The mixture is then heated with shaking for 2 hours at 40° C., 2 hours at 70° C., and 1 hour at 120° C. The cylinder is cooled to 0° and the contents removed and distilled. Trimethylfluorosilane (24 parts) comes off first, and 9.5 parts of a colorless liquid boiling at 54° at 175 mm. pressure, $n_D^{25}$ 1.3323, $d_{25}^{25}$ 1.536, $d_4^{25}$ 1.532, is recovered.

Analysis.—Calcd. for F$_6$P$_2$N$_2$C$_2$H: C, 10.3; H, 2.6; F, 48.7; N, 12.0; P, 26.4. Found: C, 10.5; H, 2.4; F, 47.6; N, 11.7; P, 26.4. Molecular weight: Calcd., 234. Found by mass spectrometer, 234.

Infrared spectrum (liquid) 2965 (m.), 2900 (sh.), 2850 (w.), 1462, 1436 (m.), 1251 (s.), 1184, 1164 (m.), 930, 920 (v.s.), 844, 794 (s.), 660 (w.), 611 (s.), 529 (v.s.), 454 (s.).

*Fluorine NMR spectrum (in toluene) of 1,3-dimethyl-2,2,2,4,4,4-hexafluoro-1,3,2,4-diazadiphosphetidine*

Strong sharp doublet at +4027 and +4916 cycles/sec. from CFCl$_3$ internal standard $J_{P-F}=889$ cycles per second. All three fluorine atoms seem equivalent.

*Proton NMR spectrum (liquid)*

1–2–1 triplet centered at −2.48 p.p.m. from tetramethylsilane standard, $J_{P-H}=14.5$ cycles per second.

EXAMPLE 4

The procedure of Example 1 is repeated substituting a molar quantity of m-trifluoromethylphenyltetrafluorophosphorane for the phenyl tetrafluorophosphorane to give a 96% yield of

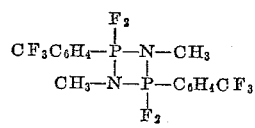

melting at (sealed tube) 164–6° C.

*Analysis.*—Calcd. for $C_{16}H_{14}F_{10}P_2$: C, 39.5; H, 2.9; F, 39.1; N, 5.8; P, 12.7. Found: C, 39.5; H, 2.9; F, 39.1; N, 5.7; P, 12.8.

Infrared spectrum (in KBr pellet) 3060, 2933 (v.w.); 2810 (v.w.); 1607 (m.); 1482 (m.); 1423 (m.); 1325 (v.s.); 1275 (sh.); 1235, 1165 (s.); 1126 (v.s.); 1092 (m.); 1071 (s.); 999 (w.); 928, 918 (m.); 895 (v.s.); 848 (v.s.); 802 (s); 752 (v.s.); 705, 698 (s.); 663 (s.).

EXAMPLES 5 THROUGH 7

*Use of diazadiphosphetidines as cocatalysts for the polymerization of ε-caprolactam*

In these examples, a mixture of 22.6 parts of ε-caprolactam and base (sodium hydride or sodium methoxide) is placed in a reaction vessel which is immersed in an oil bath at 150° C., nitrogen is bubbled through the molten caprolactam at the rate of 350 cc./minute. After heating for 20 minutes the cocatalyst to be used is added to the molten caprolactam at 150° C. The course of the polymerization is observed visually and the time from the addition of the cocatalyst to the time at which no perceptible flow of the melt occurred when the reaction vessel is held at a 45° angle is observed. This is recorded as "no flow time." The polymers made using the coactalysts of this invention are off-white and tough.

| Ex. No. | Cocatalyst | | Catalyst | | No Flow Time (min.) |
|---|---|---|---|---|---|
| | Structure | Wt. (g.) | Name | Wt. (g.) | |
| 5 | 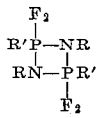 | 0.2702 | NaH/oil, 50/50 by wt. | 0.288 | 2.7 |
| 6 | C₂H₅ analog | 0.2033 | ----do---- | 0.288 | 2.5 |
| 7 | 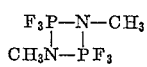 | 0.1872 | ----do---- | 0.288 | 4.0 |

I claim:

1. A compound having the structure $$\begin{array}{c} F_2 \\ R'P-NR \\ RN-PR' \\ F_2 \end{array}$$

wherein R is selected from the group consisting of methyl and ethyl and R' is selected from the group consisting of monovalent organic alkyl, cycloaliphatic and aromatic radicals containing not more than 20 carbon atoms and fluorine.

2. A compound having the structure $$\begin{array}{c} F_3P-N-CH_3 \\ CH_3N-PF_3 \end{array}$$

3. A compound having the structure

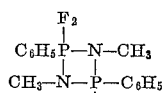

4. A compound having the structure

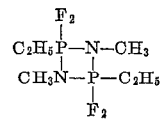

5. A compound having the structure

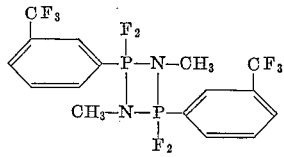

6. A process of the preparation of 1,3,2,4-diazadiphosphetidines which comprises reacting in the absence of atmospheric moisture at least one compound having the structure $PR'_bF_a$, wherein R' is selected from the group consisting of monovalent organic alkyl, cycloaliphatic and aromatic radicals containing not more than 20 carbon atoms and fluorine, $a$ is 4 through 5, and $b$ is zero through 1, and the sum of $a$ and $b$ is 5, with at least one compound having the structure $R_3SiN(R)SiR_3$, wherein R is selected independently from the group consisting of methyl and ethyl, at a temperature from about 0° C. to about 150° C.

7. The process of claim 6 wherein $PF_5$ is reacted with $(CH_3)_3SiN(CH_3)Si(CH_3)_3$.

8. The process of claim 6 wherein $C_6H_5PF_4$ is reacted with $(CH_3)_3SiN(CH_3)Si(CH_3)_3$.

9. The process of claim 6 wherein the temperature is from about 20° C. to about 50° C.

References Cited by the Examiner

Chapman et al.: J. of the Chem. Soc. (1961), 1825–27.

WALTER A. MODANCE, *Primary Examiner.*

H. I. MOATZ, *Assistant Examiner.*